Figure 1:
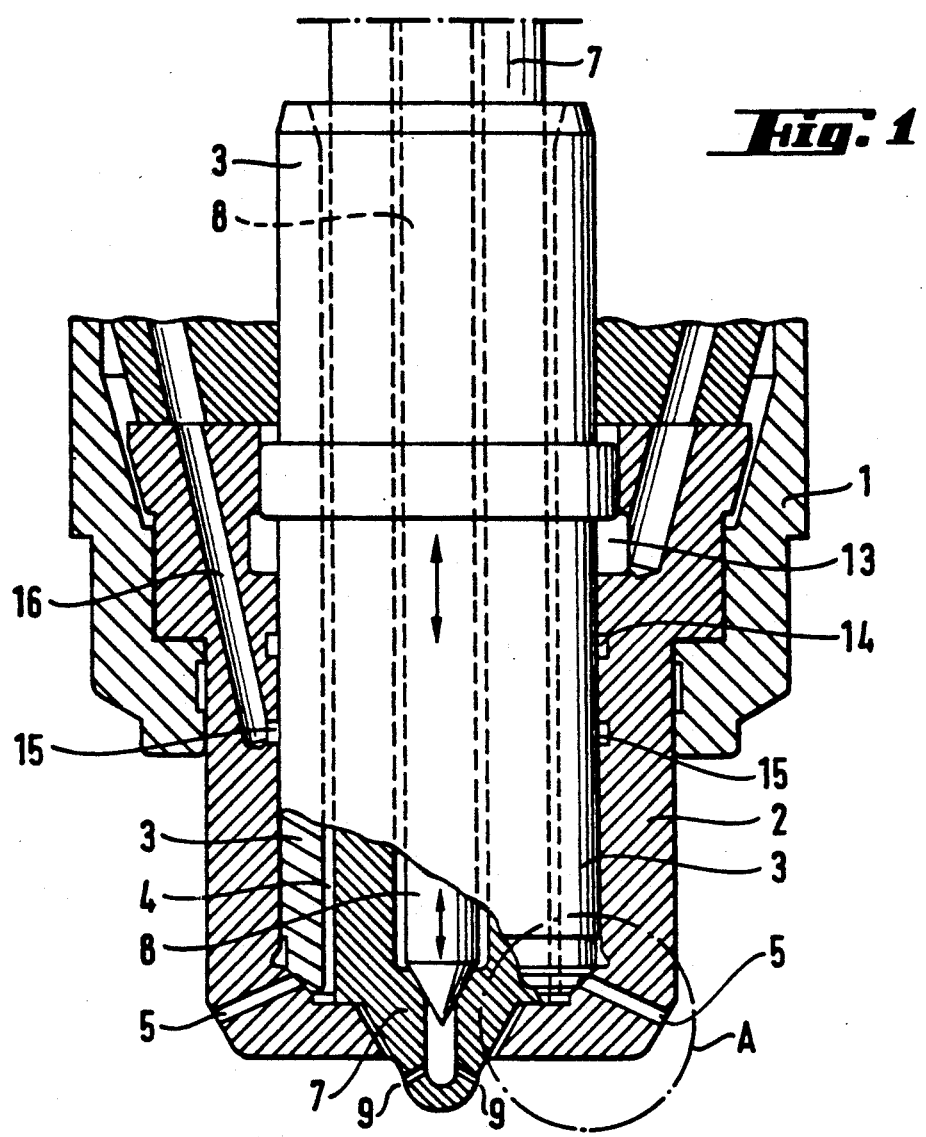

United States Patent [19]
Nylund

[11] Patent Number: 5,199,398
[45] Date of Patent: Apr. 6, 1993

[54] FUEL INJECTION VALVE ARRANGEMENT

[75] Inventor: Ingemar Nylund, Korsholm, Finland

[73] Assignee: Wartsila Diesel International Ltd. Oy, Helsinki, Finland

[21] Appl. No.: 895,517

[22] Filed: Jun. 8, 1992

[30] Foreign Application Priority Data

Jun. 25, 1991 [FI] Finland .................................. 913093

[51] Int. Cl.[5] ............................................. F02M 43/04
[52] U.S. Cl. .................................... 123/299; 123/304; 239/408
[58] Field of Search ................... 123/27 GE, 294, 299, 123/300, 304, 526; 239/408, 409, 533.3

[56] References Cited
U.S. PATENT DOCUMENTS

| | | | |
|---|---|---|---|
| 1,786,946 | 12/1930 | Hofmann | 123/294 X |
| 1,857,256 | 5/1932 | Nordberg | 123/304 |
| 4,856,713 | 8/1989 | Burnett | 239/409 X |

Primary Examiner—Tony M. Argenbright
Attorney, Agent, or Firm—Dellett, Smith-Hill and Bedell

[57] ABSTRACT

Improved fuel injection valve arrangement for so called dual fuel engines operated using two types of fuel, comprising a valve housing (2), which includes at least one nozzle orifice (5) opening into a combustion chamber of a cylinder in a combustion engine and which further includes first valve means for gaseous fuel and, independently controllable thereof, second valve means for pre-injection fuel used for ignition of the gaseous fuel. The valve means for the gaseous fuel comprises an axially movable, cylindrical, substantially hollow valve member (3), the mantle surface of which is sealed to the valve housing (2), at least at the end located at the side of the combustion chamber of the cylinder, and inside of which there is a separate valve means (7;8) for the pre-injection fuel. The end part of the said valve member (3) located at the side of the combustion chamber is arranged to control the supply of the gaseous fuel from inside the valve member (3) into said at least one nozzle orifice (5), said end part being designed to comprise two sealing surfaces (10a, 10b) placed on either side, in the moving direction of the valve member (3), of said at least one nozzle orifice (5) and arranged in co-operation with corresponding surfaces (11a, 11b) in the valve housing (2).

4 Claims, 2 Drawing Sheets

FUEL INJECTION VALVE ARRANGEMENT

The invention relates to a fuel injection valve arrangement for dual fuel engines.

When using gaseous fuel in internal combustion engines the gaseous fuel is injected according to one concept, especially in diesel engines, directly into the combustion chamber of the engine cylinder. Due to the high ignition temperature of the gas used, e.g. methane, the ignition of gaseous fuel is accomplished with pre-injection of some more easily combustible fuel, e.g. diesel oil. This type of engines are called dual fuel engines.

In dual fuel engines the fuel injection is with advantage accomplished using a combined injection valve structure, where the valve housing contains axially concentric, independently controllable valve means for gaseous fuel as well as for the pre-injection fuel used for ignition of the gaseous fuel. Thereby the valve means for the gaseous fuel may include an axially movable, cylindrical, substantially hollow valve member, inside of which there is a separate valve means for the pre-injection fuel. In order to decrease friction and due to the fact that combustion gases tend to penetrate from the combustion chamber of the cylinder into the clearance between the said valve member and the valve housing, the mantle surface of the valve member is sealed to the valve housing through high pressure lubrication oil. However, if the engine is operated using diesel oil only, which may occur when the engine is operated under a low load, e.g. when starting and stopping the engine, the high pressure lubrication oil may flow into the nozzle orifices for the gaseous fuel, which consequently may clog up completely by carbon residue. No matter when then switching over to operating the engine again with gaseous fuel, the relatively lower gas pressures prevailing in this kind of circumstances are not sufficient to open the clogged nozzle orifices, but hard and time-consuming opening of the orifices is required. If, on the other hand, the pressure of the lubrication oil is swithed off or it is reduced, combustion gases are free to penetrate into the clearance between the valve member and the valve housing to cause damage.

An aim of the invention is to provide a new, improved fuel injection valve arrangement for dual fuel engines operating with two types of fuel from which the drawbacks described above have been eliminated.

The aim of the invention can be met with the arrangement in accordance with the invention according to which the end part of the said valve member located at the side of the combustion chamber is arranged to control the supply of the gaseous fuel from inside the valve member into said at least one nozzle orifice, said end part being designed to comprise two sealing surfaces placed on either side, in the moving direction of the valve member, of said at least one nozzle orifice and arranged in co-operation with corresponding surfaces in the valve housing. Thus, there are first sealing surfaces provided to function as a valve controlling supply of the gaseous fuel, the second sealing surfaces correspondingly being provided, on the one hand, to prevent the combustion gases from penetrating into the clearance between the valve member and the valve housing and, on the other hand, to prevent the lubrication oil fed under pressure into this clearance from flowing into the nozzle orifices for gaseous fuel in different operation conditions of the engine.

In practice, the sealing surfaces located closer to the combustion chamber of the cylinder control supply of the gaseous fuel and the outer sealing surfaces prevent the connection of the clearance between the valve member and the valve housing to the combustion chamber of the cylinder. The said sealing surfaces are with advantage constructed to be conical. Thus it is possible to arrange a slightly different cone angle for the sealing surfaces in the valve member and the sealing surfaces in the valve housing cooperating therewith so that when the valve is closed a higher surface pressure is caused against the sealing surfaces located closer to the said combustion chamber of the cylinder. This secures precise operation of the gaseous fuel supply system and provides, nevertheless, in practice sufficient disconnection of the said clearance from the combustion chamber of the cylinder, especially preventing the lubrication oil from flowing into the nozzle orifices. Naturally it is also possible, if desired, to affect the function of the sealing surfaces by selecting their respective materials such that the material of the sealing surfaces in either member is softer and deforms within the scope of elastic deformations, whereby sufficient tightness of all the sealing surfaces can be secured.

Figure 2:
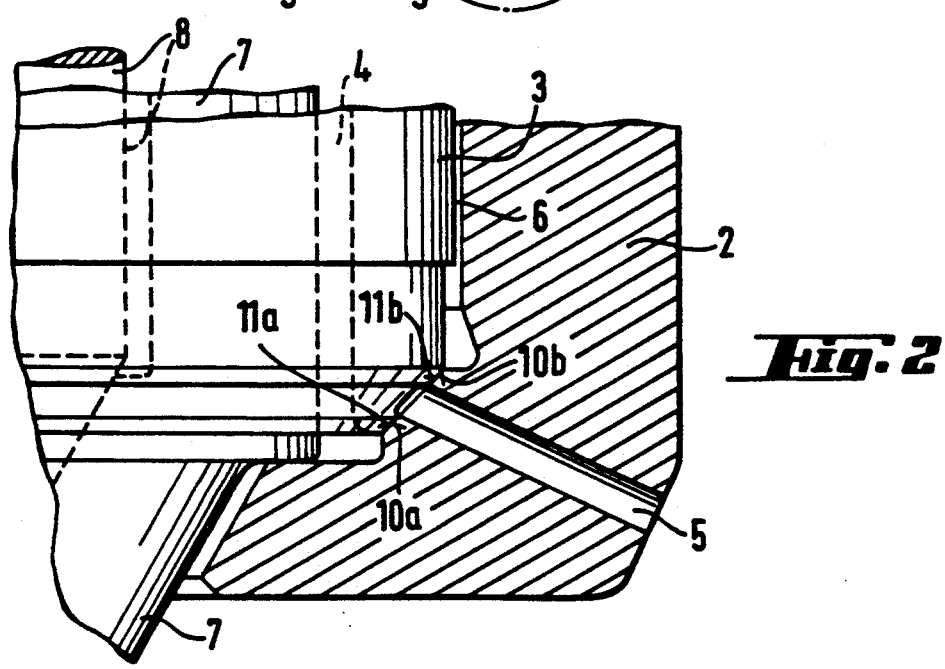
Figure 3:
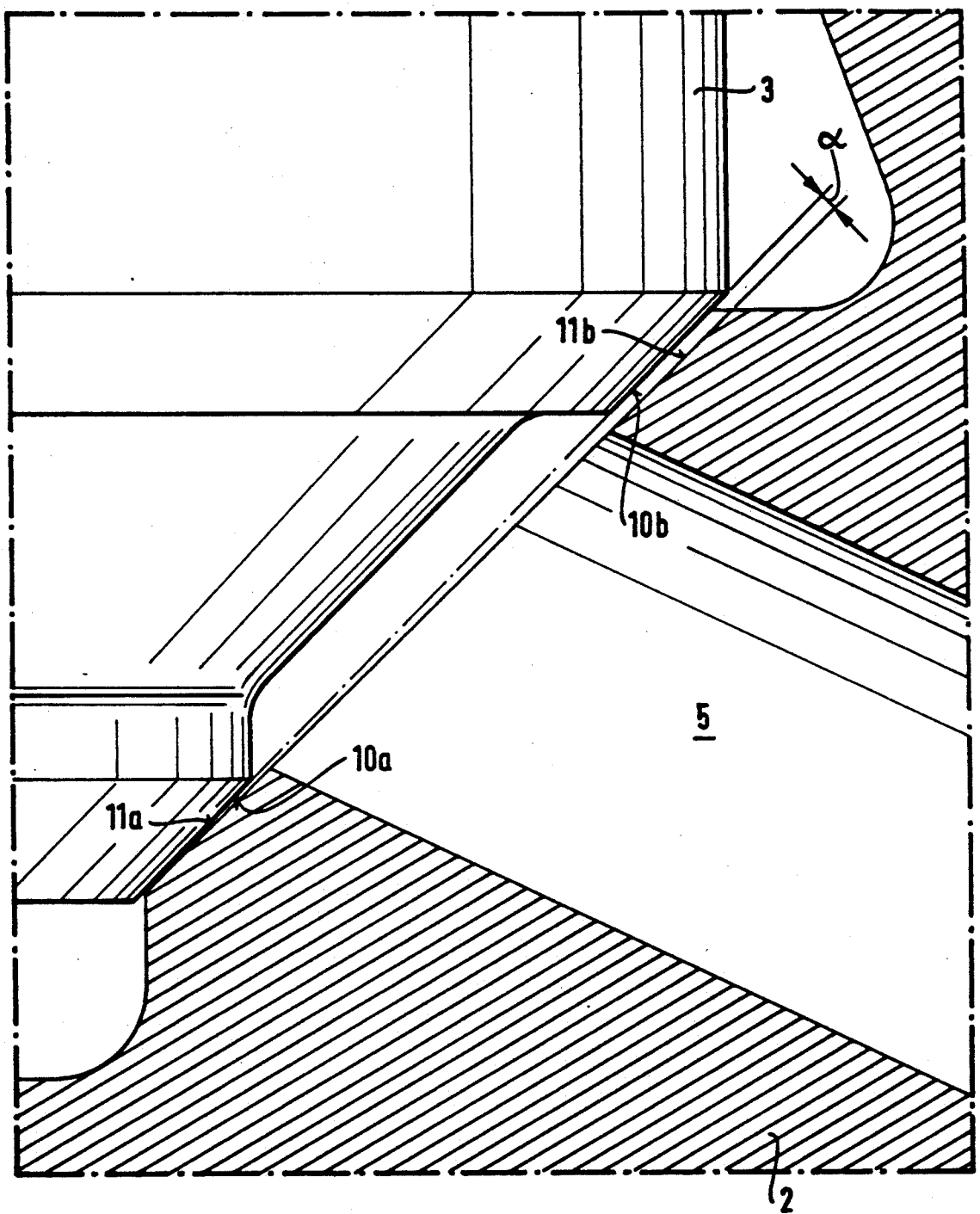

The invention will now be further described, by way of example, with reference to the accompanying drawings, in which FIG. 1 shows a cross section of a valve arrangement according to the invention, FIG. 2 is an enlargement of point A of FIG. 1, FIG. 3 is an enlargement of the sealing surfaces of the valve member.

The reference 1 in the drawing indicates a frame, which encloses valve means for injecting gaseous fuel into a not-shown cylinder, on the one hand, and for pre-injection fuel used for ignition of the gaseous fuel, on the other hand, and by means of which the injection valves are supported to a not-shown engine block.

Reference 2 indicates a valve housing for the injection valve of the gaseous fuel, which is provided with a number of nozzle orifices 5 opening into a combustion chamber in the engine. Inside the valve housing 2 there is an axially movable valve member 3, which is sealed with lubrication oil to the valve housing 2 and which, for its part, encloses the valve means for the pre-injection fuel. This valve means includes a valve housing 7, and inside it, an axially movable valve member 8, which controls supply of the pre-injection fuel from the space between the valve housing 7 and the valve member 8 through nozzle orifices 9 of the valve member 8 into a cylinder of the engine for ignition of the gaseous fuel.

FIG. 1 discloses also a lubrication oil groove 13, through which lubrication oil is fed at high pressure into a clearance 6 between the valve housing 2 and the valve member 3 in order to decrease friction and at the same time to prevent combustion gases from penetrating into said clearance 6 through the nozzle orifices 5. Oil grooves 14 and 15 accumulate and spread lubrication oil, which is lead away through the last mentioned oil groove 15 and a channel 16 connected to it.

The end part of the valve member 3 located on the side of the combustion chamber is formed so as to comprise two sealing surfaces 10a and 10b located on either side of the nozzle orifices 5 in the moving direction of the valve member 3 and which are in co-operation with corresponding sealing surfaces 11a and 11b in the valve housing 2 as apparent from FIG. 2. With the sealing surfaces 10a and 11a the valve member 3 controls supply of the gaseous fuel from the space 4 between the valve housing 7 and the valve member 3 through the nozzle orifices 5 into the combustion chamber of the cylinder.

In case the engine is running under partial load using diesel fuel fed through the valve 7,8 only or possibly through an entirely separate valve which is in connection with the combustion chamber of the cylinder, the pressures inside the engine cylinder are on a considerably lower level. As a consequence the lubrication oil fed at high pressure into the clearance 6 between the valve housing 2 and the valve member 3 tends to flow into the nozzle orifices 5, whereby it forms carbon residue and may entirely clog up the nozzle orifices 5. This is eliminated by means of the sealing surfaces 10b and 11b.

FIG. 3 shows how the sealing surfaces 10a and 10b in the valve member 3 and the sealing surfaces 11a and 11b in the valve housing 2 arranged in co-operation therewith have a slightly different cone angle so that when the valve is closed the sealing surfaces 10a and 11a, which are closer to the combustion chamber of the cylinder are subject to a higher surface pressure. In this way it is possible to provide a precise supply of the gaseous fuel the sealing surfaces otherwise keeping tight. This does not, however, have any essential effect on the function of the sealing surfaces 10b and 11b, because the sealing oil naturally is considerably thicker than the gaseous fuel. The difference of cone angles of the sealing surfaces (marked with $\alpha$ in FIG. 3) may be e.g. 1°-2°.

The invention is not limited to the embodiment shown but several modifications are feasible within the scope of the attached patent claims.

I claim:

1. Improved fuel injection valve arrangement for so called dual fuel engines operated using two types of fuel, comprising a valve housing (2), which includes at least one nozzle orifice (5) opening into a combustion chamber of a cylinder in a combustion engine and which further includes first valve means for gaseous fuel and, independently controllable thereof, second valve means for pre-injection fuel used for ignition of the gaseous fuel, whereby the valve means for the gaseous fuel comprises an axially movable, cylindrical, substantially hollow valve member (3), the mantle surface of which is sealed to the valve housing (2), at least at the end located at the side of the combustion chamber of the cylinder, and inside of which there is a separate valve means (7;8) for the pre-injection fuel, the end part of the said valve member (3) located at the side of the combustion chamber being arranged to control the supply of the gaseous fuel from inside the valve member (3) into said at least one nozzle orifice (5), said end part being designed to comprise two sealing surfaces (10a, 10b) placed on either side, in the moving direction of the valve member (3), of said at least one nozzle orifice (5) and arranged in co-operation with corresponding surfaces (11a, 11b) in the valve housing (2).

2. Injection valve arrangement according to claim 1, wherein the sealing surfaces (10a, 11a) which are closer to the combustion chamber of the cylinder control supply of the gaseous fuel and the outer sealing surfaces (10b, 11b) prevent the connection of a clearance (6) between the valve member (3) and the valve housing (2) to the combustion chamber of the cylinder.

3. Injection valve arrangement according to claim 2, wherein the said sealing surfaces (10a,10b; 11a,11b) are conical.

4. Injection valve arrangement according to claim 3, wherein the sealing surfaces (10a,10b) in the valve member and the sealing surfaces (11a,11b) in the valve housing co-operating therewith have a slightly different cone angle causing a higher surface pressure against the sealing surfaces (10a,11a) located closer to the combustion chamber of the cylinder when the valve is closed.

* * * * *